United States Patent [19]

Paganessi et al.

[11] Patent Number: 4,834,779
[45] Date of Patent: May 30, 1989

[54] PROCESS FOR MEMBRANE SEPERATION OF GAS MIXTURES

[75] Inventors: Joseph E. Paganessi, Burr Ridge; Richard A. Sauer, Hinsdale, both of Ill.; Daniel C. Deloche, Paris, France

[73] Assignee: Liquid Air Corporation, Walnut Creek, Calif.

[21] Appl. No.: 193,103

[22] PCT Filed: Oct. 27, 1986

[86] PCT No.: PCT/US86/02296

§ 371 Date: Apr. 7, 1988

§ 102(e) Date: Apr. 7, 1988

[51] Int. Cl.$^4$ ............................................. B01D 53/22
[52] U.S. Cl. ........................................... 55/16; 55/68; 55/158; 55/210; 210/604; 210/621; 210/188; 435/311
[58] Field of Search ............................. 55/16, 68, 158; 210/188, 604, 621; 435/240, 242, 311

[56] References Cited

U.S. PATENT DOCUMENTS

| | | | |
|---|---|---|---|
| 1,496,757 | 6/1924 | Lewis et al. | 55/16 |
| 3,241,293 | 3/1966 | Pfefferle | 55/16 |
| 3,489,144 | 1/1970 | Dibelius et al. | 55/158 X |
| 3,494,174 | 2/1970 | Green et al. | 55/158 X |
| 3,545,931 | 12/1970 | McKinley, Jr. | 55/16 X |
| 3,604,246 | 9/1971 | Toren | 55/16 X |
| 3,674,435 | 7/1972 | VanLuik, Jr. et al. | 55/16 X |
| 3,735,559 | 5/1973 | Salemme | 55/158 X |
| 3,923,461 | 12/1975 | Barden | 55/158 X |
| 3,925,037 | 12/1975 | Ward, III et al. | 55/158 |
| 4,080,288 | 3/1978 | Pilson | 55/16 X |
| 4,187,086 | 2/1980 | Walmet et al. | 55/158 X |
| 4,718,921 | 1/1988 | Makino et al. | 55/16 |
| 4,750,918 | 6/1988 | Sirkar | 55/158 X |

FOREIGN PATENT DOCUMENTS

| | | | |
|---|---|---|---|
| 52252 | 5/1982 | European Pat. Off. | 435/311 |
| 159783 | 10/1985 | European Pat. Off. | 55/16 |
| 2239000 | 2/1973 | Fed. Rep. of Germany | 210/188 |
| 15303 | 4/1985 | Japan | 435/311 |
| 137806 | 7/1985 | Japan | 55/16 |
| 197298 | 10/1985 | Japan | 55/158 |
| 266199 | 11/1987 | Japan | 55/16 |
| 2139110 | 11/1984 | United Kingdom | 55/16 |

Primary Examiner—Robert Spitzer
Attorney, Agent, or Firm—George F. Bethel; Patience K. Bethel

[57] ABSTRACT

A method for the substantial separation of at least one gas component from a gas mixture to generate a residue gas substantially depleted of the gas components to be separated. A semipermeable membrane is provided which has a feed gas side and a sweep gas side. The feed gas side is contacted with a feed gas mixture containing at least one gas to be retained and at least one gas to be separated therefrom. The sweep side is simultaneously contacted with a sweep gas having a pressure lower than that of the feed gas. The partial pressure of certain gas components present on both sides of the membrane are balanced to cause the remaining gas components to diffuse in either direction across the membrane depending upon their differential partial pressures. Apparatus for the gas separation is also provided.

24 Claims, 4 Drawing Sheets

PROCESS FOR MEMBRANE SEPERATION OF GAS MIXTURES

BACKGROUND OF THE INVENTION

1. Field of the Invention

This invention relates to the field of separation of gas mixtures and particularly to the separation of a single component from a mixture of gases. A semipermeable membrane and a purge gas are used. The purge gas contains at least one of the gases desired to be retained on the feed side of the membrane. The purpose of this is to minimize the passage across the membrane of the gases to be retained and encourage the passage across the membrane from the feed side to the purge side of the gas component to be separated.

2. Description of the Prior Art

The prior art has separated gases from mixtures using semipermeable membranes from a feed side to a diffusion side by drawing a vacuum on the diffusion side.

Another method commonly used is to pass a feed gas on one side of a semipermeable membrane and to pass a purge gas on the opposite side. A higher pressure is used for the feed gas than for the purge gas to encourage the diffusion of molecules from the feed side to the purge side. If the concentration of the desired gases to be diffused is less on the sweep side, then the differential in pressure will cause diffusion of such gases from the feed side to the purge side. Unfortunately the method does not permit the passage of a single element from a mixture of gases since generally the partial pressure of all the components on one side of the membrane are less on the sweep side as well as the concentration thereof.

Another method includes using a very thin semipermeable membrane which is selectably permeable for a specific gas such as hydrogen. In this instance, the feed gas is passed in contact with the semipermeable membrane and only the molecule which is selectively permitted to pass will go through the membrane. This method has limited application since such highly selective membranes are limited to very few gas elements at the present time.

SUMMARY OF THE INVENTION

The present invention is based on the concept that, using a semipermeable membrane, operating under typical conditions of feed gas injection into the high pressure side of the membrane, through the use of a purge gas, the partial pressure differential across the membrane of gas components not present in the purge gas will increase, resulting in higher relative mass transfer to those gas components through the membrane. In addition, the use of the purge gas decreases the partial pressure differential across the membrane of those gas components present in the purge gas resulting in a lower relative mass transfer through the membrane. This process can be used to more selectively transfer specific gas components through the membrane.

According to another aspect of the invention, in a mixture of gases, certain gas components present in gas mixtures on both sides of a semipermeable membrane can have their respective partial pressures balanced so that there is substantially a zero partial pressure differential. The remaining gas components then will diffuse in either direction across the membrane depending upon their differential partial pressures.

This invention can find specific application in the field of fermentation sciences in which air enriched with oxygen is passed through a fermentation vat by any suitable means for purposes of speeding up the fermentation reaction. This air/oxygen enrichment produces off-gases from the fermentation vat consisting, for example, of 30% by volume of oxygen, 55% by volume of nitrogen, and 15% by volume of carbon dioxide. In the past, such gases were simply vented to the atmosphere.

According to the invention process, these gases, maintained at a pressure of for example 75 psia, are passed on one side of a semipermeable membrane and a sweep gas or purge gas comprising compressed air at preferably about 52.2 psia is passed on the opposite side of the membrane. At these two relative pressures, the partial pressure differential of nitrogen on both sides of the membrane is essentially zero. This causes the minimal passage of oxygen and nitrogen in either direction across the membrane and maximizes the passage of the carbon dioxide from the feed gas side to the sweep gas side.

The resulting residue gas on the feed side is slightly depleted in oxygen and greatly reduced in carbon dioxide to the extent of less than 1% carbon dioxide. This resulting gas can then be recycled through the fermentation vat with the addition some oxygen to make up for the volume of gas lost in the diffusion through the semipermeable membrane. The residue gas which is recycled requires lesser amounts of oxygen enrichment than would be required without recycling of the gases. It is necessary to remove the carbon dioxide since percentages above about 5% can stop the fermentation reaction.

The advantageous results which are obtained by this method include reduced costs in that less oxygen is required for enrichment of the gases which are pumped through the fermentation vat. Furthermore, the pressure of the compressed air used as the sweep gas is especially selected to minimize the partial pressure of the nitrogen across the membrane. Not only does this encourage the diffusion of carbon dioxide into the sweep gas, but also there is significant energy conservation.

It was found that as the pressure of the compressed air sweep gas was increased above the pressure needed to balance the partial pressure of nitrogen that nitrogen began to pass from the sweep side to the feed side. This diluted the oxygen gas present effectively reducing its concentration. A greater addition of oxygen to the original gases was then required to increase the oxygen concentration. It is desired to keep the overall volume constant and to operate the recycling and separation of carbon dioxide in a continuous manner.

DETAILED DESCRIPTION OF THE INVENTION

Figure 1:
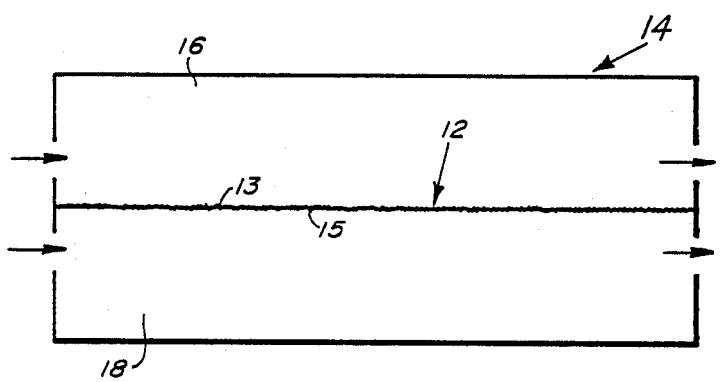
FIG. 1 shows a schematic representation of the process of the invention.

Referring now to FIG. 1 of the drawings there is shown schematically a semipermeable membrane 12 having a feed side 13 and a sweep side 15 disposed in a chamber 14. The membrane 12 bisects the chamber 14 dividing it into two compartments, a feed gas compartment 16 and a sweep gas compartment 18.

A gas mixture containing one or more gases to be separated therefrom is passed through the feed gas compartment 16 of chamber 14 into contact with the feed side 13 of the membrane 12.

The gas mixture on the feed side is comprised of at least one gas component to be separated and at least one gas component to be retained. The purge gas is comprised of at least one gas component of the same identity as one of the gas components to be retained on the feed side.

This provides at the minimum the same gas species on both the feed side of the membrane and on the sweep side of the membrane. In addition, the gas or gases to be separated from the gas mixture on the feed side can be present on the sweep side as long as the molar concentration of such gas is substantially less on the sweep side and the partial pressure is greater on the feed side.

The invention steps comprise selecting a feed gas pressure and a sweep gas pressure which provides substantially a zero partial pressure differential across the membrane for at least one gas component to be retained which is present on the feed gas side and on the sweep gas side. This substantially minimizes passage of the retained gas component in either direction across the membrane. At the same time, if the concentration of the gas to be separated is present in substantially greater molar concentrations of the feed side, its partial pressure will be higher on the feed side. This causes the gas component to be separated to pass from the feed side to the sweep side of the membrane.

In the event that there are present in the gas mixture to be separated, more than one gas to be retained, then it is advantageous to provide an identical gas component in the sweep gas mixture so that passage from the feed side to the sweep side will be minimized. The extent to which passage will take place in either direction across the membrane will depend upon the partial pressure differential of such gases. The gas will pass from the side of greater partial pressure to the side of lesser partial pressure.

Virtually any type of semipermeable membrane can be used in any convenient form. For example, a single membrane or a bank of membranes can be employed as can membranes in the form of hollow fibers arranged in bundles. Liquid membranes can also be used.

Such membranes can be made of cellulose acetate, polysulfones, polyimides, polyamides, silicones, polytetrafluoroethylenes and the like. The identity of the membrane is not critical to the invention process.

Figure 2:
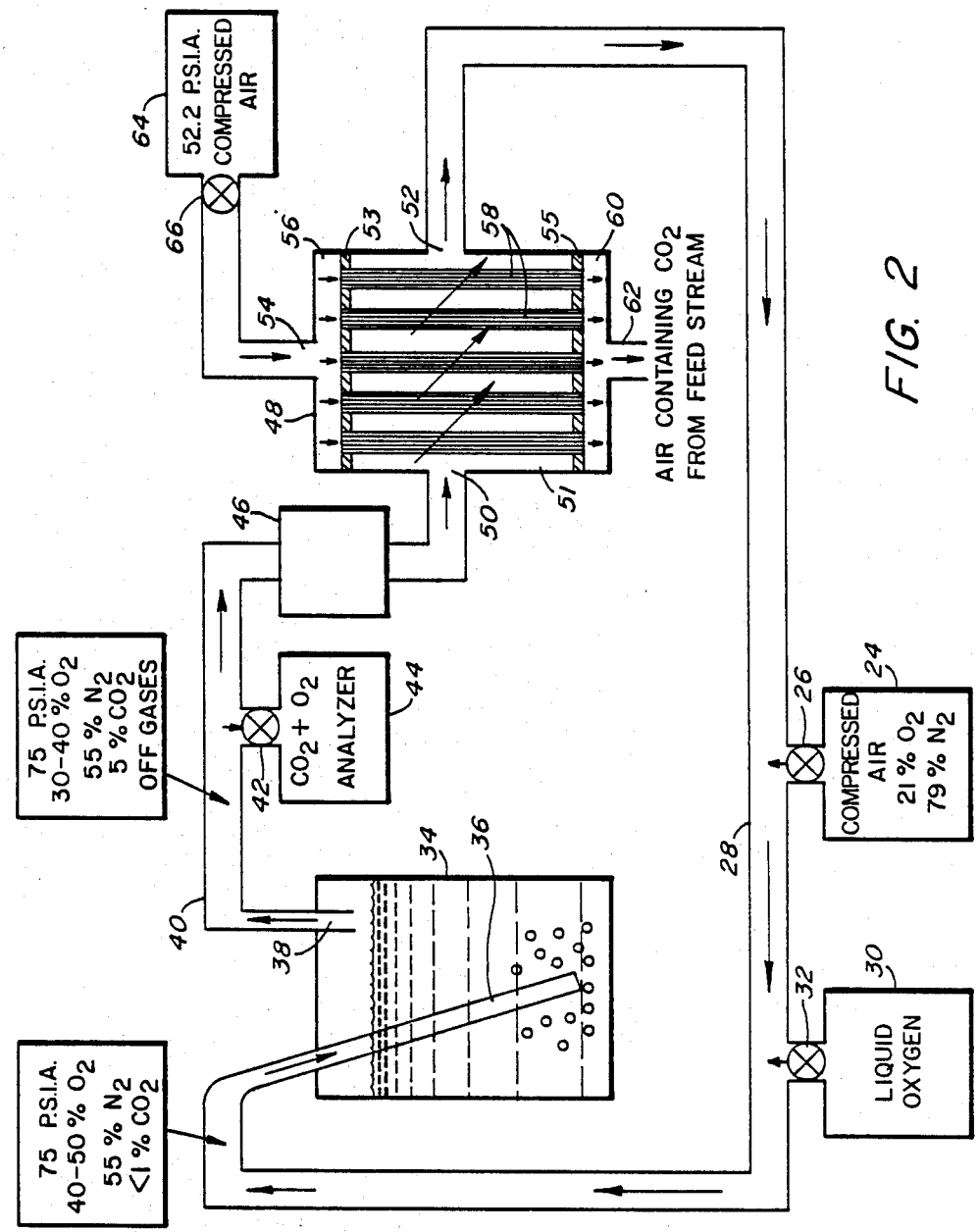
FIG. 2 shows a schematic representation of a system embodying the process steps of the invention.

FIG. 2 shows a schematic representation of a preferred embodiment of the invention. Compressed air from a compressor 24 passes through a valve 26 where it enters a conduit 28. Liquid oxygen from a tank 30 enters conduit 28 by means of valve 32. The resulting mixture of preferably about 40% to about 50% oxygen, 55% nitrogen and <1% carbon dioxide at a pressure of for example 75 psia is bubbled through a fermentation vat 34 by means of a tube 36. Tube 36 introduces the gas mixture near the bottom of the vat 34.

The introduction of the gas mixture causes the fermentation in the vat to speed up. During the fermentation process, the oxygen is consumed in the biological processes which take place. The off gases escaping from the vat 34 are comprised of for example, 30% to 40% oxygen, 55% nitrogen and 15% carbon dioxide. The off gases escape from the vat 34 through outlet 38 where they enter conduit 40. A portion of the gas is diverted through valve 42 to carbon dioxide and oxygen analyzer 44. Here, the off gases are analyzed for percentage of oxygen and carbon dioxide. The amount of the nitrogen is found by difference.

The off gases are then passed through compressor 46 to bring the pressure to for example 75 psia since some pressure losses are experienced during the reaction. From the compressor 46, the off gases are passed into a chamber 48 for separation of the carbon dioxide.

The exact pressure of the feed gas and of the sweep gas is not critical. The invention lies in selecting the respective pressures to balance the partial pressure of the component to be retained in the feed gas mixture which is present on both sides of the membrane.

Chamber 48 contains an inlet 50 and an outlet 52 for the respective introduction and withdrawal of off gases into a central chamber 51. Another inlet 54 for purge or sweep gas communicates with a plenum 56. A plurality of bundles of hollow fibers 58 are disposed within the chamber 50 and are sealed from end communication by means of layers 53 and 55 within which the bundles are sealably fixed so that communication is blocked between plenum 56 and central chamber 51 except by passage through the hollow fibers. One end of each of bundles opens into the plenum 56, and the opposite end of each of the bundles opens into a plenum 60 which communicates with an outlet 62.

A compressor 64 introduces compressed air sweep gas through a valve 66 at a pressure of about 52.2 psia into inlet 54 to plenum 56. Since the plenum 56 is sealed with respect to the inner central chamber 51, the air passes through the central bore of each of the hollow fibers of bundles 58. At the same time, the off gases at a pressure of 75 psia pass into central chamber 51 of chamber 48 by means of inlet 50.

Within the central chamber 51, the off gases contact the exterior surface of the hollow fiber bundles which have the sweep gas in the form of compressed air passing therethrough. With these relative pressures, the partial pressure of nitrogen across the hollow fiber membrane is essentially zero. This precludes passage of nitrogen gas in either direction across the fiber membranes.

The partial pressure of carbon dioxide is substantially greater on the feed or off gas side so that almost all of the carbon dioxide diffuses through the fiber membranes and is carried away in the sweep gas stream.

The partial pressure of oxygen is somewhat greater on the off gas or feed side of the fiber membranes so that some oxygen will diffuse into the sweep gas. However, this passage is further minimized by the fact that the partial pressure differential across the membrane of oxygen is less than the partial pressure differential across the membrane of carbon dioxide. This results in the carbon dioxide being preferentially diffused.

The residue gas which exits inner chamber 50 by means of outlet 52 reenters conduit 28 where additional oxygen is added to it to bring the oxygen percent up to about 40% to about 50%. In this manner the reaction can proceed continuously as long as desired.

It will be apparent that the feed gas can be made to pass through the bores of the hollow fibers and the sweep or purge gas can be passed into contact with the exterior surfaces of the fiber bundles. It is a matter of passing the feed gas on one side of the membrane surface and the sweep gas on the opposite side. The invention should not be limited to which side is selected since both sides can be employed.

Since it is desirable to equalize the partial pressure of nitrogen on both sides of the membrane, it is necessary to be able to determine what the partial pressure is on the feed side of the membrane so that an equivalent partial pressure can be provided on the sweep side of the membrane.

This can be established by first determining the concentration of oxygen and carbon dioxide in the gas by means of the oxygen and carbon dioxide analyzer. With a knowledge of the concentration of these two gases, the concentration of the nitrogen can then be determined by the difference. When the concentration of the nitrogen is known, its fraction is then multiplied by the pressure of the feed gas to give the partial pressure.

Since the sweep gas is composed of air and the concentration of nitrogen is fixed in air at about 79%, the concentration does not need to be calculated. To calculate the required pressure needed on the sweep gas side, it is necessary to divide the partial pressure of nitrogen on the feed side by the concentration of nitrogen on the sweep side. This equals the required feed pressure of the sweep gas in order to provide equal partial pressures across the semipermeable membrane.

For example, a feed gas pressure of 75 psia provides a partial pressure at 55% nitrogen of $0.55 \times 75$ psia which equals 41.25 psia partial pressure nitrogen. On the sweep side with a 79% concentration of nitrogen, the partial pressure of 41.25 psia divided by 0.79 equals a required sweep as pressure of 52.2 psia. Thus, a sweep gas pressure of 52.2 psia $\times$ 79% nitrogen gives a nitrogen partial pressure on the sweep side of 41.2. This is equal to the partial pressure of nitrogen on the feed gas side. This balances the nitrogen partial pressure across the membrane to that the differential is essentially zero.

When similar calculations are made for oxygen at a feed gas concentration of 30% to 40%, it is found that at the same pressures that the partial pressure of oxygen on the feed side is 30 psia ($0.40 \times 75$ psia) for 40% oxygen and 22.5 psia ($0.30 \times 75$ psia) for 30% oxygen. The partial pressure of oxygen on the sweep side is 11 psia (52.2 psia $\times$ 0.21). This gives a partial pressure differential of 19 psia for 40% oxygen and about 10 psia for 30% oxygen. As a consequence there is some diffusion across the membrane from the feed side to the sweep side. In the case of the lower percentage of oxygen, i.e. 30%, diffusion of the oxygen is minimized since the partial pressure differential across the membrane is greater for the carbon dioxide.

A concentration of 15% carbon dioxide on the feed side gives 11.25 psia partial pressure of carbon dioxide on the feed side $0.15 \times 75$ psia) and, since the sweep gas contains no carbon dioxide there is approximately a 11.25 psia partial pressure differential if it is assumed that there is no carbon dioxide on the sweep gas side. In actuality since the gas will be continuously diffusing, the partial pressure differential is slightly less. The partial pressure differential causes the carbon dioxide to pass to the sweep gas side from the feed gas side.

The following examples are given for purposes of illustrating the invention and are in no way intended to limit the scope of the invention.

EXAMPLES

Example 1

Substantially the apparatus shown in FIG. 2 was used for increasing fermentation. Initially compressed air was enriched with oxygen to provide a concentration of 40% oxygen, 55% nitrogen and <1% carbon dioxide. This gas was continuously introduced into a fermentation vat at a pressure of 75 psia. The off gases were analyzed and found to contain 55% nitrogen, 30% oxygen, and 15% carbon dioxide.

The gases were then passed through a compressor to bring the pressure to 75 psia. The pressurized off gas mixture was then made to contact the exterior surfaces of hollow fiber membrane bundles. At the same time compressed air containing 21% oxygen and 79% nitrogen was passed through the interior bores of the hollow fiber membrane bundles.

Analysis of the residual gas showed a composition consisting of 69% nitrogen, 30% oxygen, and 1% carbon dioxide. The permeate gas was analyzed and found to contain 2% carbon dioxide, 21% oxygen and 77% nitrogen.

It should be noted that the permeation of carbon dioxide from the feed gas caused a relative increase in the concentrations of both the oxygen and nitrogen relative to the total volume of gas. Similarly, while it appears that there is no loss of oxygen from the feed gas, in fact, some of the oxygen diffused across the membrane. However, the carbon dioxide is effectively removed and the off gases can then be recycled with the addition of less oxygen than would be required if only compressed air were used. This represents a significant cost savings.

Example 2

Substantially the procedure of example 1 was repeated except that the feed gas mixture was passed through the central bore of the bundles of hollow fiber membranes while the compressed air sweep gas was passed into contact with the exterior surfaces of the hollow fibers. Substantially the same results were obtained.

Figure 3:
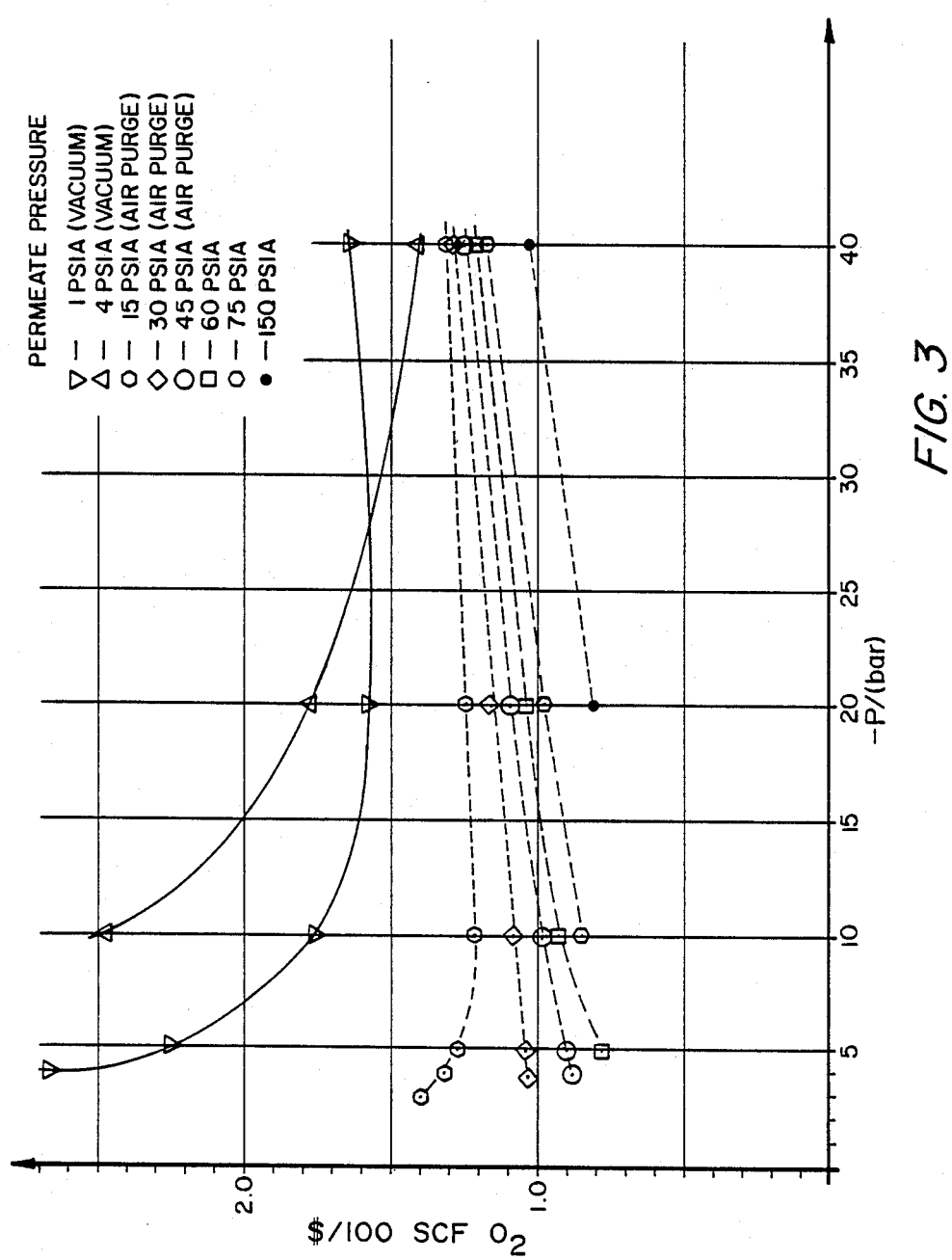
FIG. 3 is a graph showing the reduced cost effectiveness of the invention using a sweep gas as compared to a vacuum and a cellulose acetate membrane.
Figure 4:
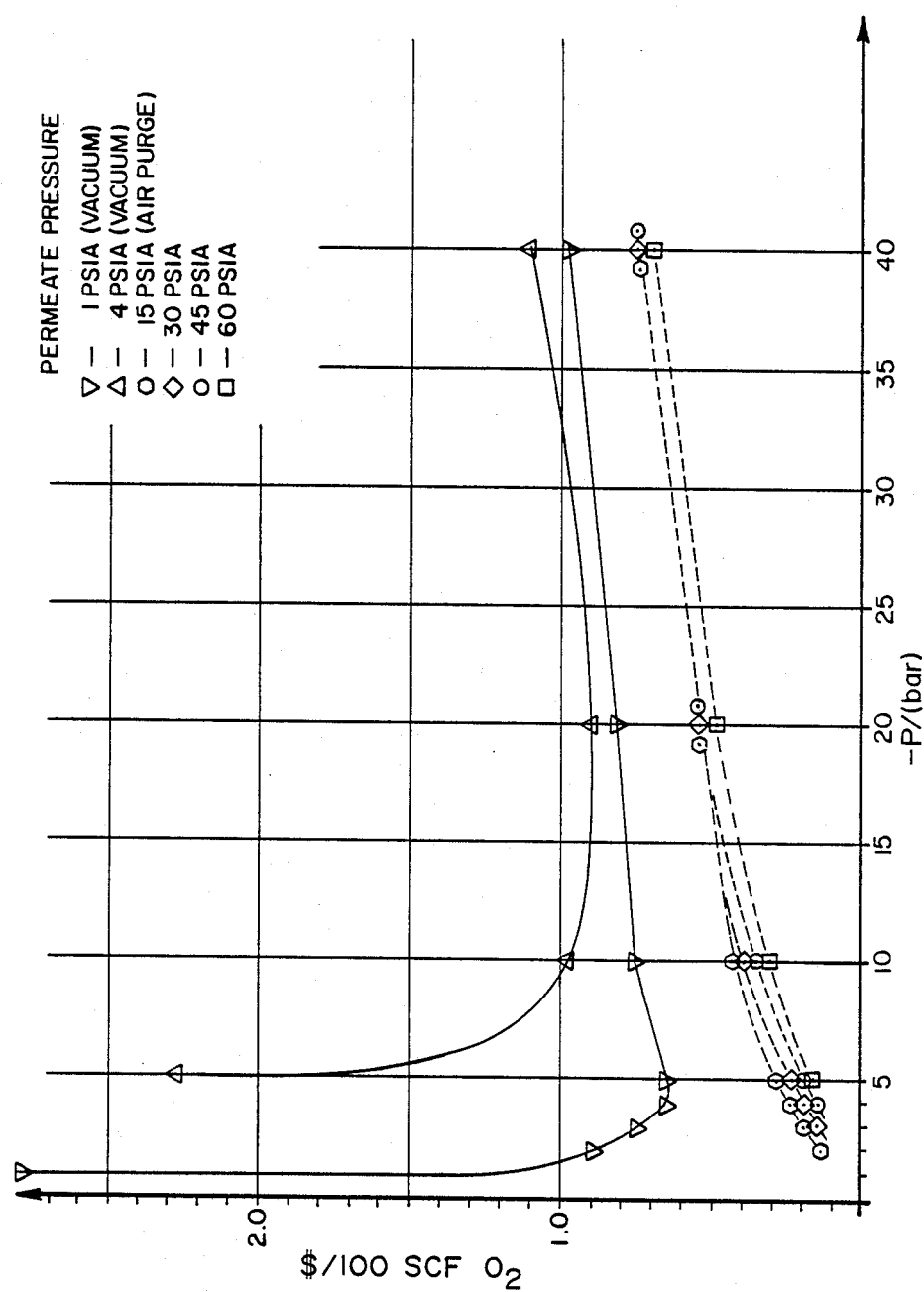
FIG. 4 is a graph showing the reduced cost effectiveness of the invention using a sweep gas as compared to a vacuum and a polysulfone membrane.

FIGS. 3 and 4 show graphs which demonstrate the cost savings obtained following the above example by using a purge or sweep gas and a membrane by comparison with using only a vacuum across the membrane.

FIG. 3 shows the use of a cellulose acetate membrane and FIG. 4 shows use of a polysulfone membrane. In both the graphs, the y axis represents the cost in dollars for amounts of oxygen which are required and the x axis shows the variation in pressure shown in atmospheres. In both the graphs it can be seen that the solid lines representing the use of a vacuum is far more expensive than when a purge or sweep gas is used as represented by the dotted lines even at pressures as high as 150 psia.

Lowest costs were obtained at feed gas pressures of about 5 atmospheres or about 73.5 psia with a purge or sweep gas pressure of 60 psia which is consistent with the invention process.

A further feature of the invention comprises balancing the partial pressure of a first gas to be retained to provide as close as possible substantially equal partial pressures across the membrane while at the same time providing a partial pressure differential across the membrane for a second gas to be retained, which partial pressure differential is slightly less than the partial pressure differential of the gas to be separated. This will effectively maximize diffusion across the membrane of the gas to be separated while minimizing diffusion across the membrane of the gases to be retained.

Thus, in the case of nitrogen, oxygen, and carbon dioxide, the partial pressure of nitrogen is balanced to the extent possible across the membrane while at the same time keeping the partial pressure differential across the membrane of carbon dioxide greater than the partial pressure differential across the membrane of oxygen. This causes the carbon dioxide to be preferentially diffused to the sweep side while diffusion of the nitrogen and oxygen in either direction is minimized.

Various modifications of the invention are contemplated which will be obvious to those skilled in the art and can be resorted to without departing from the spirit and scope of the invention as defined by the following claims.

We claim:

1. A method for substantial separation of at least one gas component from a gas mixture to generate a residue gas substantially depleted of said gas components comprising the steps of:
    providing a semipermeable membrane having a feed gas side and a sweep gas side;
    contacting said feed gas side of said semipermeable membrane with a feed gas mixture containing at least one gas to be retained and at least one gas to be separated therefrom;
    simultaneously contacting said sweep side of said semipermeable membrane with a sweep gas having a pressure lower than that of said feed gas and containing at least one of the same gas components to be retained in said feed gas mixture;
    balancing the partial pressures of at least one of the gas components to be retained on said feed gas side which is present on both sides of the membrane so that the partial pressure differential on both sides of the membrane is substantially zero to minimize passage across the membrane in either direction of the gas component to be retained and at the same time providing a partial pressure differential of said gases to be separated such that the partial pressure of each said gases to be separated on said feed side is greater than the partial pressure of each said gases respectively on said sweep side to encourage passage of said gases to be separated from said feed gas mixture side across said membrane to said sweep side;
    withdrawing a residue gas after contact with said feed side of said membrane which is substantially depleted of said gases to be separated; and,
    withdrawing a permeate gas after contact with said sweep side of said membrane which is substantially enriched with said gases to be separated.

2. A method as claimed in claim 1 wherein said process is continuous.

3. A method as claimed in claim 1 wherein said feed gas mixture contains two gases to be retained, which gas is present on said sweep gas side, said method further comprising:
    balancing said partial pressure of said first gas to be retained to provide as close as possible substantially equal partial pressures across the membrane while at the same time providing a partial pressure differential across the membrane for said second gas to be retained, which partial pressure differential is slightly less than the partial pressure differential of said gas to be separated to maximize diffusion across the membrane of said gas to be separated while minimizing diffusion across the membrane of said gases to be retained.

4. A method as claimed in claim 1 wherein said semipermeable membrane is comprised of a plurality of bundles of hollow fiber tubes.

5. A method as claimed in claim 1 wherein said semipermeable membrane is comprised of a liquid membrane.

6. A method as claimed in claim 1 wherein said process further comprises the steps of:
    providing an enclosure having said semipermeable membrane disposed therein which separates said enclosure into a first and a second chamber;
    contacting said feed gas side of said semipermeable membrane by passing said feed gas mixture through said first chamber into contact with said semipermeable membrane while simultaneously contacting said sweep gas side of said semipermeable membrane by passing said sweep gas mixture through said second chamber;
    withdrawing said residue gas from said first chamber after contact with said feed gas side of said semipermeable membrane which residue gas is substantially depleted on said gases to be separated;
    withdrawing said permeate gas from said second chamber which permeate gas is substantially enriched with said gases to be separated.

7. A method as claimed in claim 1 wherein said feed gas mixture is comprised of nitrogen, oxygen, and carbon dioxide;
    said gases to be retained on said feed gas side of said semipermeable membrane comprise nitrogen and oxygen;
    said gas to be separated from said feed gas mixture on said feed gas side of said semipermeable membrane comprises carbon dioxide; and,
    said gas to be retained on said feed gas side of said semipermeable membrane whose partial pressure is balanced to provide substantially a zero partial pressure differential across the membrane is nitrogen.

8. In a method for accelerating chemical processes wherein oxygen is added to such processes alone or admixed with other gases and wherein off gases are removed from said processes which gases include, as a result of reaction in said processes, at least one undesired gas, the improvement which comprises:
    recycling said off gases for reuse by a method which comprises:
    providing a semipermeable membrane having a feed gas side and a sweep gas side;
    contacting said feed gas side of said semipermeable membrane with said off gases containing at least one gas to be retained and at least one gas to be separated therefrom;
    simultaneously contacting said sweep side of said semipermeable membrane with a sweep gas having a pressure lower than that of said feed gas;
    withdrawing a residue gas after contact with said feed side of said membrane which is substantially depleted of said gases to be separated;

withdrawing a permeate gas after contact with said sweep side of said membrane which is substantially enriched with said gases to be separated;

adding oxygen to said permeate gas to the desired level for the chemical processes to be accelerated; and, introducing said permeate gas enriched with oxygen to said chemical processes.

9. A method as claimed in claim 8 further comprising:

balancing the partial pressures of at least one of the gas components to be retained on said feed gas side which is present on both sides of the membrane so that the partial pressure differential on both sides of the membrane is substantially zero to minimize passage across the membrane in either direction of the gas component to be retained and at the same time providing a partial pressure differential of said gases to be separated such that the partial pressure of each said gases to be separated on said feed side is greater than the partial pressure of each said gases respectively on said sweep side to encourage passage of said gases to be separated from said feed gas mixture side across said membrane to said sweep side.

10. A method as claimed in claim 8 wherein said process is conducted continuously.

11. A method as claimed in claim 8 wherein said chemical process to be accelerated is fermentation.

12. A method as claimed in claim 11 wherein said gas mixture including oxygen used to speed up fermentation is air;

said undesired gas present in said off gases is carbon dioxide; and, said sweep gas is air.

13. A method as claimed in claim 12 wherein said air is enriched with oxygen prior to introduction to said fermentation process; and, wherein said gases to be retained in said off gases comprise nitrogen and oxygen; and wherein:

the partial pressure of nitrogen which is present on both sides of said semipermeable membrane is balanced to provide a partial pressure differential which is substantially zero;

said residue gas being substantially depleted of carbon dioxide and said permeate gas being substantially enriched with carbon dioxide.

14. A method for accelerating fermentation reactions which comprises:

providing a reaction vessel for said fermentation reaction;

enriching air with oxygen;

introducing said air enriched with oxygen into said reaction vessel;

withdrawing off gases from said reaction vessel which gases are comprised of nitrogen and oxygen which are desired and carbon dioxide which is undesired;

providing a semipermeable membrane having a feed gas side and a sweep gas side;

contacting said feed gas side of said semipermeable membrane with said off gases;

simultaneously contacting said sweep gas side of said semipermeable membrane with a sweep gas comprising air having a pressure lower than that of said feed gas;

withdrawing a residue gas after contact with said feed side of said membrane which is substantially depleted of carbon dioxide;

withdrawing a permeate gas after contact with said sweep side of said membrane which is substantially enriched with carbon dioxide;

adding oxygen to said permeate gas to the desired level for the fermentation reaction to be accelerated; and, introducing said permeate gas enriched with oxygen into said fermentation reaction vessel.

15. A method as claimed in claim 14 further comprising:

balancing the partial pressures of nitrogen which is present in the feed gas and in the sweep gas on opposite sides of the membrane so that the partial pressure differential on both sides of the membrane is substantially zero to minimize passage of nitrogen across the membrane in either direction and at the same time providing a partial pressure differential of carbon dioxide such that the partial pressure of carbon dioxide on said feed side is greater than the partial pressure of carbon dioxide on said on said sweep side to encourage passage of carbon dioxide from said feed gas mixture side across said membrane to said sweep side.

16. A method as claimed in claim 14 wherein said process steps are repeated continuously.

17. A method as claimed in claim 16 further comprising the steps of:

providing an enclosure having said semipermeable membrane disposed therein which separates said enclosure into a first and a second chamber;

contacting said feed gas side of said semipermeable membrane by passing said feed gas mixture through said first chamber into contact with said semipermeable membrane while simultaneously contacting said sweep gas side of said semipermeable membrane by passing said sweep gas mixture through said second chamber;

withdrawing said residue gas from said first chamber after contact with said feed gas side of said semipermeable membrane which residue gas is substantially depleted of carbon dioxide;

withdrawing said permeate gas from said second chamber which permeate gas is substantially enriched with carbon dioxide.

18. A method as claimed in claim 17 wherein said membrane is a liquid membrane.

19. A method as claimed in claim 17 wherein said membrane is comprised of bundles of hollow fibers having a central bore.

20. A method as claimed in claim 19 wherein said feed gas mixture is passed into contact with the exterior surfaces of said hollow fibers while said sweep gas is passed through said central bore of said respective hollow fibers of said bundles.

21. A method as claimed in claim 19 wherein said feed gas mixture is passed through said central bore of each respective hollow fiber of said bundles while said sweep gas is passed into contact with the exterior surfaces of said hollow fibers.

22. The method as claimed in claim 14 further comprising:

recycling said permeate gas for reuse wherein said recycled permeate gas is enriched with oxygen to provide a gas mixture comprising from about 40% to about 50% oxygen, <1% carbon dioxide, and the balance nitrogen.

23. A method as claimed in claim 22 wherein said off gases are comprised of about 5% to about 15% carbon dioxide, oxygen and nitrogen.

24. A system for the acceleration of fermentation comprising:
- a source of compressed air;
- a source of oxygen;
- a fermentation vat comprising a substantially closed vessel having an inlet and an outlet;
- means within said vat in communication with said inlet for the introduction of gases;
- means within said vat in communication with said outlet for the removal of gases;
- first conduit means in communication with said source of compressed air and said source of oxygen and with said means within said vat for the introduction of gases;
- second conduit means in communication with said outlet of said vat;
- a carbon dioxide and oxygen analyzer in communication with said conduit means for analyzing gases passing through said conduit means for the presence of carbon dioxide and oxygen;
- a compressor in communication with said second conduit means for pressurizing gas passing therethrough;
- an enclosure;
- a semipermeable membrane disposed within said enclosure which divides said enclosure into a first and second separate compartment each having an inlet and an outlet which compartments communicate only by passage across said membrane;
- third conduit means in communication with said compressor and with said inlet of said first compartment;
- fourth conduit means in communication with said source of compressed air and said inlet of said second compartment of said enclosure;
- fifth conduit means in communication with said outlet of said first compartment of said enclosure and with said first conduit means for conducting residue gas from said first enclosure back to said vat for recycling.

* * * * *